United States Patent [19]

Shimizu

[11] 4,202,737
[45] May 13, 1980

[54] ION EXCHANGE PROCESS FOR DESALINATION

[75] Inventor: Hiroshi Shimizu, Tokyo, Japan

[73] Assignee: Rohm and Haas Company, Philadelphia, Pa.

[21] Appl. No.: 930,478

[22] Filed: Aug. 2, 1978

[51] Int. Cl.² ............................................. B01D 15/06
[52] U.S. Cl. ......................................... 210/32; 521/26
[58] Field of Search ...................... 521/26, 33; 210/24, 210/32, 33

[56] References Cited

U.S. PATENT DOCUMENTS

| | | | |
|---|---|---|---|
| 3,077,479 | 2/1963 | Luten et al. | 521/26 |
| 3,645,922 | 2/1972 | Weiss et al. | 521/26 |
| 3,660,282 | 5/1972 | O'Brien | 210/33 |
| 3,691,109 | 9/1972 | Larsen | 521/26 |
| 4,087,357 | 5/1978 | Barrett et al. | 210/32 |

*Primary Examiner*—Charles N. Hart
*Assistant Examiner*—E. Rollins Cross

[57] ABSTRACT

An ion exchange process for desalination wherein a thermally regenerable ion exchange resin having weakly acidic free acid groups and weakly basic free base groups is carbonated, for example by contact with an $H_2CO_3$ solution, whereby the free base groups are converted to a carbonate form. The conversion may be effected either prior to or simultaneously with contact between the resin and the solution to be desalinated. Both fixed bed and continuous or semi-continuous resin systems are usable. The process maintains the desalination capacity at a high level while providing effective desalination.

14 Claims, 4 Drawing Figures

ION EXCHANGE PROCESS FOR DESALINATION

BACKGROUND OF THE INVENTION

This invention relates to a novel process for desalination employing ion exchange resins having both weakly acidic groups and weakly basic groups, wherein the weakly basic groups are converted to a carbonate form and the resin is thermally regenerated, consequently allowing the resin to retain a high capacity for desalination.

In desalination using ion-exchange resins having both weakly acidic groups and weakly basic groups, a heat-regeneration type desalination process is known whereby cyclic use of the resin is accomplished by eluting and regenerating the resin by application of heat. The desalination capacity obtainable by this process is low, e.g., about 0.1 gram equivalent per liter of resin beads.

The most widely adopted ion-exchange method for desalination has been chemical regeneration which uses two kinds of ion-exchange resins, i.e., cation-exchange resins and anion-exchange resins, and which accomplishes cyclic use of these resins by regenerating the resins by an acid regenerant and a base regenerant, respectively. The effective desalination capacity obtained by this process is high, being about 0.4 to 0.8 gram equivalent per liter of the combined volume of the two kinds of resins.

To achieve the same level of desalination the conventional thermal regeneration type desalination process must therefore use a volume of ion-exchange resin several times the volume used by ordinary chemical regeneration type desalination processes. The thermal regeneration process, accordingly, requires more space for equipment and larger regin inventories which require a larger amount of heat for equivalent desalination.

SUMMARY OF THE INVENTION

A primary aspect of the desalination process of the present invention is the discovery that conversion of at least a portion of the weakly basic free base ion exchange functional groups of a thermally regenerable ion exchange resin to a carbonate form, makes it possible to effectively maintain the capacity of the resin for desalination at a high level, decrease the volume of resin used and space occupied by the equipment, and economize the amount of heat consumed for thermally regenerating the resin, as compared with the conventional method. In addition, the salt concentration of the desalinated water is maintained at a low level, waste heat can be utilized for the elution, and waste flue gases of suitable composition can be utilized for the conversion of the weakly basic groups into a carbonate form.

Moreover, the concentrated waste resulting from elution does not require any special treatments such as neutralization, precipitation and separation, such treatments being indispensable in chemical regeneration type desalination processes. Thus, the method of the present invention constitutes a novel process enjoying various advantages such as are touched upon above.

In the following description the term "elution" refers to removal of salt which has been loaded onto the ion exchange resin during the desalination process, and the term "regeneration" refers to restoration of the ion exchange functional groups of the resin to free base and free acid form. Since these operations are each thermally activated, they will occur essentially simultaneously. Accordingly, it will be understood that these terms are not mutually exclusive and description of elution will necessarily also involve regeneration, although the cooling sometimes required after the regeneration will occasionally be referred to as an aspect of regeneration.

DETAILED DESCRIPTION

Figure 1:
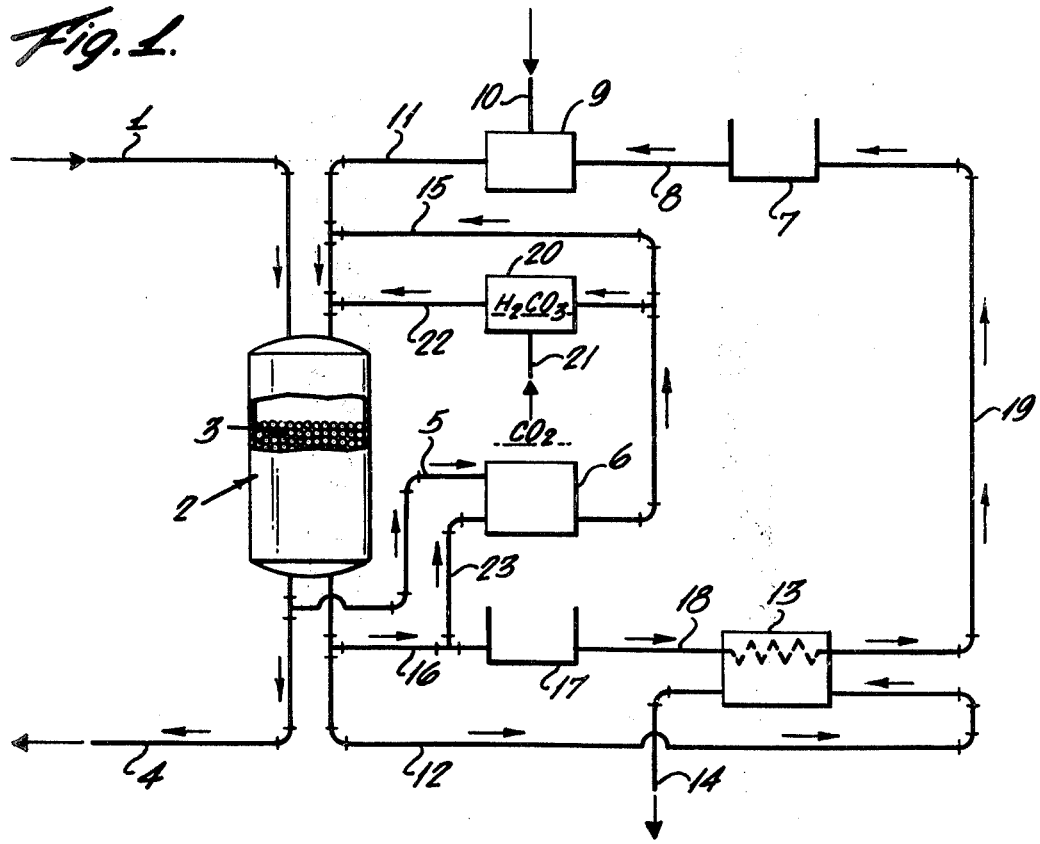

The ion-exchange resin used in the method of the present invention is particulate and has both weakly acidic groups and weakly basic groups within the resin matrix.

Generally, the component particles are spherical (e.g. beads) or amorphous in shape and preferably measure about 1.2 to 0.3 mm in particle diameter, more preferably about 0.5 mm. The size must not be such that the particles, when packed in the form of a fixed bed or moving bed, cause a pressure loss to the passage of a liquid under treatment, to the extent of rendering the passage of the liquid difficult. Additionally, the size must be such that the particles, when used in a fluidized-bed type operation, will not overflow the ion-exchange vessel by the ascending flow of a liquid. Further, the size must be such that the individual resin particles permit an aqueous solution to be readily dispersed therein. The particle diameter of the resin desirably should be as small as possible, to enhance the rate at which desalination, elution and conversion to the carbonate form proceed, since these rates increase with decreasing particle diameter. For this reason, it is permissible to use fine ion-exchange resins which are equivalent to ion-exchange resins of the present invention plus a magnetic substance such as gamma-$Fe_2O_3$, so that the individual particles, in a packed bed, are allowed to attract one another by dint of the magnetism, with the result that the void ratio is increased and the sedimentation velocity is enhanced.

Among the ion-exchange resins useful in this invention, are hybrid resins in the form of beads each containing a plurality of weakly acidic groups and weakly basic groups. Also useful are composite ion-exchange resin in the form of beads obtained by mixing finely divided particles of a cation-exchange resin having weakly acidic groups with finely divided particles of an anion-exchange resin having weakly basic group, held together by an inert binder.

An example of a hybrid ion-exchange resin is a resin in the form of beads each containing both weakly acidic groups and weakly basic group and which has as its matrix a polystyrene copolymer of macroreticular structure cross-linked with divinylbenzene and possessing weakly basic groups, with the macropores in the matrix filled with an acrylic acid copolymer cross-linked with divinylbenzene and possessing weakly acidic groups. U.S. Pat. No. 3,991,017 describes a resin of this type.

An example of a composite ion-exchange resin is a resin obtained by mixing at an approximate ratio of 1:3 finely divided particles (about 1 to 10 microns in diameter) of an anion-exchange resin having weakly basic group and finely divided particles (about 5 to 10 microns in diameter) of a weakly acidic cation exchange resin of a copolymer of acrylic acid with divinylbenzene as a cross-linking agent, conglomerating the resultant mixed particles with a binder of polyvinyl alcohol cross-linked with a dialdehyde and pelletizing the resulting mass. For use as the binder, a polymeric substance is selected which permits ready permeation and diffusion of an aqueous solution and which is insoluble in water. U.S. Pat. No. 3,645,922 describes composite resins of the foregoing type.

The weakly acidic group in the ion-exchange resin to be used in the method of this invention is a group such as polyacrylic acid or polymethacrylic acid which has an acid dissociation constant (pKa) of about 5 to 6 and is monofunctional in form. If the pKa is too large, the effective elution capacity is small, although regeneration of the weak base groups by heating is easily accomplished. If the pKa is too small, the thermal regeneration of the weak base groups is difficult to accomplish in spite of a large elution capacity, the net result being that the effective elution capacity will be lowered after thermal cycling. Use of polyfunctional weakly acid groups is undesirable because they have a smaller effective elution capacity than monofunctional countertypes.

The weakly basic group in the ion-exchange resin to be used in the method of this invention is an alkyl tertiary amino group, such as dimethyl amine or diethyl amine, which has a base dissociation constant (pKb) of about 8 to 9, is monofunctional in form, readily undergoes conversion into a carbonate form, and provides highly selective adsorption of a proton onto hydrogen carbonate ion. If the pKb is too large, the conversion into the carbonate form contemplated by this invention fails to proceed readily and the effective elution capacity is small although regeneration by heating is easily accomplished. If the pKb is too small, thermal regeneration is difficult to accomplish in spite of easy conversion to the carbonate form, with the net result being a reduction in elution capacity after thermal cycling. A polyfunctional weakly basic group tends to show a lower effective elution capacity than the monofunctional countertype. Also, polyfunctional weakly basic groups (such as a primary or secondary amino group or an alkanol amine group) generally exhibit weak thermal stability and, therefore, are susceptible to decomposition during thermal regeneration. Thus, such resins tend to lose their elution capacity after prolonged use. Weak base groups in a chloride or hydrochloride form are useful.

The resin matrix (substrate polymer) of the ion-exchange resin used for the method of this invention is the same or similar to those employed in ordinary ion-exchange resins. Examples are polystyrenes cross-linked with divinylbenzene as a cross-linker, aromatic or aliphatic polymers such as crosslinked polyacrylic or polymethacrylic resins, and polycondensates such as epoxy resins.

The desalination by the method of this invention is characterized by effecting the desalination of a given liquid while converting the weakly acidic groups in the resin into their free acid form and the weakly basic group in the same resin into a carbonate form, or by effecting the desalination after converting the ion-exchange resin from the free base form into a carbonate form.

In the conventional method of desalination using thermally regenerable resins, the desalination occurs when the weakly acidic groups are in the free acid form and the weakly basic groups are in the free base form. The mechanism of this desalination reaction involves the transfer of protons from weakly acidic groups to weakly basic groups as indicated in equation (1) below and the rate of the desalination process is governed by the rate of proton transfer. In the following equations, R' and R denote the matrixes (substrate polymers) of the resinous portions of the ion-exchange resin involved, and N is the nitrogen atom of a weakly basic amine such as a tertiary amino group. It will be understood that R and R' may exist in the same resin particle or may exist separately, i.e., in different particles, and may be the same or different polymeric materials.

$$R'COOH + RN + Na^+Cl^- \rightarrow R'COO^- + RN^+H + Na^+Cl^- \rightarrow R'COO^-Na^+ + RN^+HCl^- \quad (1)$$

Totally unlike this reaction, the method of the present invention either converts the weakly basic groups of the ion-exchange resin into a carbonate form prior to desalination or effects the desalination while making the conversion into a carbonate form. The expression "conversion into a carbonate form" as used herein means formation of a salt group with carbonic acid present in water. Because of the dibasic nature of carbonic acid, the salt group thus formed assumes the form of an ammonium carbonate, $R-N^+H\ HCO_3^-$. This reaction is represented by equation (2). Since this reaction is neutral in type and the water in the reaction system is extremely weakly ionizable, the reaction proceeds efficiently to the right side of equation (2) and hardly at all in the reverse direction. Consequently, the weakly basic group having a weak ionizing property acquires an

$$R-N + H_2O + H_2CO_3 \rightleftharpoons R-N^+H\ HCO_3^- + H_2O \quad (2)$$

enhanced ionizing property through formation of a salt with carbonic acid. When the resultant group comes into contact with the salt of a strong acid, for example, sodium chloride or ammonium sulfate, there ensues an anion-exchange reaction as indicated by equation (3) or (4), whereby the resin becomes loaded with the anion of the saline solution being desalinated (anion removal is also facilitated by the reactions of equations 9 and 10, discussed below).

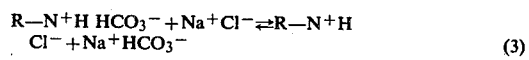

$$R-N^+H\ HCO_3^- + Na^+Cl^- \rightleftharpoons R-N^+H\ Cl^- + Na^+HCO_3^- \quad (3)$$

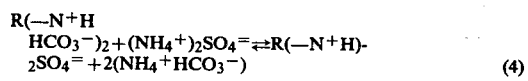

$$R(-N^+H\ HCO_3^-)_2 + (NH_4^+)_2SO_4^= \rightleftharpoons R(-N^+H)_2SO_4^= + 2(NH_4^+HCO_3^-) \quad (4)$$

As indicated above, the weakly basic group in the ion-exchange resin suitable for use in the method of this invention is a type having a pKb value of the order of 8 to 9, permitting ready formation of a salt group with carbonic acid, the resulting hydrogen carbonate ion being highly ion exchangeable with salts of strong acids such as sodium chloride, as illustrated in equations (3) and (4). The reactions of equations (2) and (4), therefore, efficiently proceed to the right. Consequently, the resulting basic hydrogen carbonate salt reacts rapidly with the free acid form of the weakly acidic group of the resin to neutralize it and form a salt as shown in equation (5) or (6), the resin thus becoming loaded with the cation of the salt and removing the cation thereof from the saline solution being treated. Since the reaction is a neutralization and the carbonic acid in the reactant system is a weak electrolyte and therefor ionizes weakly, the reaction proceeds efficiently to the right of the equations and only very slightly in the reverse direction.

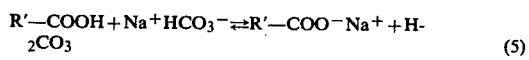

$$R'-COOH + Na^+HCO_3^- \rightleftharpoons R'-COO^-Na^+ + H_2CO_3 \quad (5)$$

$$R'\text{---COOH} + NH_4^+ HCO_3^- \rightleftarrows R'\text{---COO}^- NH_4^+ + H_2CO_3 \quad (6)$$

The reactions of equations (3) and (4) are accompanied by reverse reactions. However, since the hydrogen carbonate salt is efficiently removed by the reactions of equations (5) and (6), the reactions of equations (3) and (4) are accelerated. As an overall consequence, the reactions of equations (3) through (6) permit efficient removal of the salts of strong acids and enable the desired desalination to proceed. It will also be seen that this removal is facilitated by the reactions of equations (9) or (10).

As indicated, the weakly acidic group in the ion-exchange resin used in the method of this invention is of a type having a pKa value of the order of 5 to 6 and possessing a weak ability to decompose the salts of strong acids. Thus, the reactions of equations (7) and (8) can occur, though to a slight extent.

$$R'\text{---COOH} + Na^+Cl^- \rightleftarrows R'\text{---COO}^- Na^+ + H^+Cl^- \quad (7)$$

$$R'(\text{---COOH})_2 + (NH_4^+)_2SO_4^= \rightleftarrows R'(\text{---COO}^- NH_4^+)_2 + (H^+)_2SO_4^= \quad (8)$$

The strong acid formed as shown above reacts with the hydrogen carbonate salt form weakly basic groups having enhanced ionizing property, as shown in equations (9) and (10), and converts them into a strong acid salt form, the resin thus becoming loaded with the anion of the salt and removing the anion thereof from the saline solution being treated. This reaction is a kind of neutralization and the carbonic acid in the resultant system is a weak electrolyte and ionizes but weakly.

$$R\text{---}N^+H\ HCO_3^- + H^+Cl^- \rightleftarrows R\text{---}N^+HCl^- + H_2CO_3 \quad (9)$$

$$R(\text{---}NH\ HCO_3^-)_2 + (H^+)_2SO_4^= \rightleftarrows R(\text{---}N^+H)_2SO_4^= + 2H_2CO_3 \quad (10)$$

Thus, the reaction proceeds efficiently to the right and only slightly in the reverse direction. Although the reactions of equations (7) and (8) tend to proceed to the right to a slight extent, the strong acid in the resultant system is efficiently removed by the reactions of equations (9) and (10), thus accelerating the reactions of equations (7) and (8) to the right. As an overall consequence, the removal of salts of strong acids is efficiently carried out and the desalination proceeds rapidly by the reactions of equations (7) through (10).

Since the reactions of equations (3) through (6) and those of equations (7) through (10) can occur simultaneously in the method of this invention, the method is characterized by the fact that the reactions of equations (3) through (6) proceed very efficiently because of the presence of the weakly basic groups which have been converted into a carbonate form. The method of this invention, consequently, has the advantage that, compared with the conventional thermal regeneration type desalination involving the use of weakly basic groups in their free base form, the desalination capacity per unit volume of ion-exchange resin is larger, the salt concentrations in the desalined water are lower and desalination proceeds at a faster rate.

The strong acid salt contained in a given aqueous solution subjected to desalination by the method of this invention is a salt formed between a strong acid (such as hydrochloric acid, sulfuric acid or nitric acid) and a base. This base may be either a strong base or a weak base. To be treated effectively by this method, the aqueous solution is generally desired to have a salt concentration of not more than 3,000 mg/liter.

The elution effected on the loaded ion-exchange resin and the regeneration thereof by the method of this invention is accomplished by heating the ion-exchange resin to thereby convert the weakly acidic groups and the weakly basic groups (both in salt form) to a free acid form and a free base form, respectively. The regeneration proceeds as represented by equations (11) and (12) below.

$$R'\text{---COO}^- Na^+ + R\text{---}N^+HCl^- \xrightarrow{\Delta} R'\text{---COOH} + R\text{---}N + Na^+Cl^- \quad (11)$$

$$R'(\text{---COO}^- NH_4^+)_2 + R(\text{---}N^+H)_2SO_4^= \xrightarrow{\Delta} R'(\text{---COOH})_2 + R(\text{---}N)_2 + (NH_4^+)_2SO_4^= \quad (12)$$

The heating of the loaded ion-exchange resin is carried out similarly to the conventional thermal-regeneration type desalination process, i.e., by passing hot water at about 50° C. to 100° C., preferably about 80° C. to 95° C., through the bed of ion-exchange resin. As a regenerant source, there may be used the aqueous solution subjected to the desalination (feed), the desalinated aqueous solution (product), an insufficiently desalinated portion of aqueous solution obtained toward the end of a desalination cycle (tailings), hot waste water produced in the early stage of the thermal treatment, or waste water produced during the subsequent stage of ion-exchange resin cooling. The aqueous liquid regenerant may be heated by any ordinary method such as indirect heating with the heat of a forced flow of hot steam, heating with the heat of combustible fuels, heating with the heat from an electric heater, or exchange of heat with hot water or hot gases. From the standpoint of heat economy and for the prevention of public nuisance due to release of hot waste water, it is advantageous to recover the heat from the effluent issuing from the thermal regeneration, and to use this recovered heat in heating the water to be used in the net thermal cycle. If the hot effluent from some other system has a salt content not significantly higher than in the aqueous solution subjected to the desalination treatment, it may be used as the source for the hot water.

The ion-exchange resin, after thermal regeneration, is cooled to promote the ease with which the resin may again be converted into a carbonate form and desalination can occur. This cooling can be carried out by virtually any known method unless the method used happens to involve contact of the resin with a liquid having a significantly higher salt concentration than the aqueous solution being treated, thus, resulting in a lowering of the elution capacity of the resin. Generally, the cooling is accomplished by passing the saline solution to be desalinated (feed), the aqueous solution having undergone the elution treatment (product), an insufficiently desalinated portion of aqueous solution obtained toward the end of the desalination treatment (tailings), or the waste water issuing from the subsequent conversion to the carbonate form, through the bed of hot, regenerated ion-exchange resin. Although the only requirement in this case is that the temperature be reduced to a value comparable to the initial temperature of the saline solution to be treated, the cooling may further be continued to a lower temperature where desired, resulting in an increase in elution capacity. The temperature of the saline solution to be desalinated must be lower than the temperature required for the thermal elution, and generally should be in the range of room temperature, i.e., from about 0° to 30° C. From the standpoint of heat economy, it is advantageous to use the hot water resulting from this cooling as the source of hot water for the thermal regeneration.

The desalination is carried out in accordance with the invention either after the free base form weakly basic groups of the ion-exchange resin resulting from thermal regeneration has been converted into the carbonate form (first method) or while the carbonate form of the resin is being formed (second method).

In the first method the ion-exchange resin having free base form weakly basic groups (new resin or resin recycled after thermal regeneration) contacted with carbonic acid water prior to desalination. The contact with the carbonic acid water is generally effected by passing through the bed of the ion-exchange resin carbonic acid-containing water immediately after the step of thermal regeneration or after the subsequent step of cooling. The carbonic acid-containing water can be obtained by blowing carbon dioxide gas or a gas containing carbon dioxide into water, by spraying water into carbon dioxide gas or a gas containing carbon dioxide, or by some other similar method. Other methods may also be used for this purpose. For example, carbon dioxide gas or a gas containing carbon dioxide can be blown directly into a mixed system consisting of ion-exchange resin and water, or the ion-exchange resin can be exposed to carbon dioxide gas or a gas containing carbon dioxide to convert the carbon dioxide into carbonic acid through dissolution into the water deposited on the surface of the ion-exchange resin. The ion-exchange resin can also be converted into the carbonate form by passing through a bed of the ion-exchange resin either an aqueous solution which amply contains a carbonate or hydrogen carbonate salt or an aqueous solution which contains carbonic acid resulting from treating water which amply contains a carbonate or hydrogen carbonate salt (such as sodium carbonate or sodium hydrogen carbonate) with an acid or a hydrogen form strong acid cation-exchange resin, causing formation of carbonic acid through decomposition of the carbonate or hydrogen carbonate salt.

As the water for the conversion of the resin into the carbonate form, there can be used the aqueous solution to be desalinated (feed), the aqueous solution having undergone the desalination (product), any insufficiently desalinated portion of water obtained toward the end of the desalination treatment (tailings), or waste water already used in the process for conversion to the carbonate form. Further, waste water from the conversion may be recovered to be cyclically used in the same process.

The conversion to a carbonate form can be carried out concurrently with the cooling of the hot ion-exchange resin upon completion of thermal regeneration. In this case, the process of cooling which would otherwise be performed separately can be omitted.

When an aqueous solution containing the salt of a strong acid is brought into contact with the ion-exchange resin containing weakly basic groups converted to the carbonate form as described above, there ensues desalination involving the reactions of equations (3) through (6) and those of equations (7) through (10). As is apparent from equations (5), (6), (9) and (10), the desalination entails formation of carbonic acid. The carbonic acid thus formed can be used concurrently to convert the free base form weakly basic groups into a carbonate form. Therefore, conversion of all of the weakly basic groups into the carbonate form is not always initially required. The desalination of the aqueous solution under treatment, as previously stated, releases carbonic acid. This carbonic acid is capable of converting weak base sites in the free base form to a carbonate form as treated aqueous solutions passes into areas of the resin bed which had not been initially converted to a carbonate form. Substantially all of the weak base sites in the free base form can be made available for the desalination because the portion of the resin remaining in the unconverted form will gradually be converted as the desalination proceeds.

In the second method of desalination (in which the desalination occurs simultaneously with the conversion of the resin to the carbonate form) the saline solution under treatment is passed through the bed of the ion-exchange resin subsequently to either the thermal regeneration stage or the cooling stage which follows the thermal regeneration stage. Carbonic acid is introduced to the aqueous feed solution, prior to its passage through the bed of the ion-exchange resin, by blowing carbon dioxide gas or a gas containing carbon dioxide into the aqueous solution or by spraying the aqueous solution into an atmosphere of carbon dioxide gas or a gas containing carbon dioxide. Alternatively, the aqueous solution is mixed with a carbonic acid-containing aqueous solution in the manner already described with reference to the first method.

When the aqueous feed solution initially contains an ample amount of a carbonate or hydrogen carbonate salt or when a carbonate or hydrogen carbonate salt such as sodium carbonate or sodium hydrogen carbonate is later incorporated therein, the required amount of carbonic acid can be generated by adding an acid to the aqueous solution or treating the aqueous solution with a hydrogen form cation-exchange resin to decompose the carbonate or hydrogen carbonate salt. In this case, the aqueous solution may be subjected simultaneously to an additional treatment for pH adjustment or for removal of hardness components.

With respect to the thermal regeneration step, if the aqueous feed solution, the water used for elution or the water used for cooling, contains oxygen, there is a possibility that the ion-exchange resin in its heated state will undergo oxidation with consequent loss of useful properties. To prevent this problem, the aqueous feed solution may at times be deaerated so as to eliminate dissolved oxygen. This deaeration, however, may also deprive the aqueous solution of carbonic acid. It is therefore important that the solution be deaerated before carbonic acid is introduced in the feed solution. The conventional thermal regeneration type desalination method effects the deaeration so as to deprive the aqueous solution of both the dissolved oxygen and dissolved carbon dioxide. In the desalination method of the present invention, such indiscriminate deaeration is disadvantageous to the extent that it induces loss of carbonic acid.

The desalination reactions effected by the second method are essentially the same as described above with reference to the first method. Thus, the free base form weakly basic groups are converted into a carbonte form by the reaction of equation (2) because of the presence of carbonic acid in the feed solution and this conversion is followed by desalination through the reactions of equations (3) through (6) and equations (7) through (10). Also, the desalination entails formation of carbonic acid as is plain from equations (5), (6), (9) and (10). This liberated carbonic acid is also free to convert weak basic sites remaining in the free base form to a carbonate form as desalinated aqueous solution containing liberated carbonic acid passes into areas of the resin bed which had not been initially converted to a carbonate form.

The first and second methods described above may be suitably combined so as to accomplish the desired desalination by simultaneous or alternating application of the two methods.

The carbon dioxide gas or the gas containing carbon dioxide which is used for the conversion desirably should be free from dust and oil droplets to avoid contamination of the ion-exchange resin or loss of desalination capacity. It is also desirable to use the gas in a state free from $Cl_2$, $SO_3$, $N_2O_5$ and other gaseous compounds which on dissolution in water produce strong acids.

FIGS. 1–4 of the drawings are flow diagrams which more particularly describe the invention including preferred embodiments thereof.

FIG. 1 illustrates a typical example of a fixed-bed resin system wherein the free base form weak basic groups which have undergone thermal elution are first converted to the carbonate form, desalination being effected thereafter.

With reference to FIG. 1, an aqueous feed solution containing the salt of a strong acid and kept below 30° C. is desalinated by passage from a feed line 1 through a fixed-bed type desalination column 2 packed with an ion exchange resin 3, to afford a desalinated aqueous solution which is removed via effluent line 4. Insufficiently desalinated effluent obtained in the last part of the desalination treatment and containing salts in a lower concentration than the original aqueous solution is transferred by line 5 to circulation water tank 6 (tailings tank) to be subsequently used for cooling and for conversion into carbonate. After completion of the desalination, recovered hot water from the heat-recovering water storage tank 7 is forwarded by line 8 to a heater 9, wherein the water is heated by forced introduction of steam through line 10. Line 11 carries the resultant heated water at 80° to 95° C. to desalination column 2 to heat the ion-exchange resin bed 3 whereby the strong acid salt component adsorbed on the resin is eluted, giving rise to a hot elution waste which is removed from column 2 by line 12. The efficiency of elution can be improved by allowing the aqueous solution under treatment and hot water to flow countercurrent. The hot eluate obtained in the initial stage of the thermal elution and which, therefore, contains salts in a concentration not appreciably larger than the aqueous solution under treatment, is forwarded by line 16 to the eluant storage tank 17. For recovery of heat, water from tank 17 and the hot elution waste from column 2 are sent to the heat exchanger 13 via lines 18 and 12, respectively. The resultant concentrated waste is discarded through line 14 and, at the same time, the water having recovered heat is forwarded by line 19 to the water storage tank. Then, the water in the circulation water storage tank 6 is delivered as cooling water (below 30° C.) to desalination column 2 to cool the ion-exchange resin bed 3. The hot waste water resulting from this cooling is sent to the eluant water storage tank 17 to be used as eluting water.

Then, for conversion to a carbonate form, the water of the circulating water storage tank 6 is sent to the gas dissolver 20, in which carbon dioxide gas is blown via line 21 through the water and dissolved therein. The resultant carbonic acid water is passed via line 22 through desalination column 2 to convert the free base form weak base groups of the ion-exchange resin bed 3 a the carbonate form. The efficiency of desalination is higher when the aqueous solution under treatment and the carbonic acid water are made to flow parallel to each other than when they are allowed to flow countercurrent. The carbonated effluent occurring consequently is returned via line 23 to the circulation water storage tank 6 to be used again for adjustment of the carbonic acid water or for cooling. The independent cooling stage may be avoided, if the required cooling is instead effected during the conversion of the resin to a carbonate form, by forwarding via line 16 the hot carbonated effluent occurring in the initial phase of the conversion, to eluant water storage tank 17 and returning this effluent via line 23, after standing therein to cool off, as the effluent of carbonation to the storage tank 6. Where the aqueous solution under treatment and the carbonic acid water are allowed to flow countercurrent, it suffices to effect the conversion to a carbonate form on one fifth to one half of the weakly basic groups which have already been converted to the free base form by the thermal elution.

Figure 2:
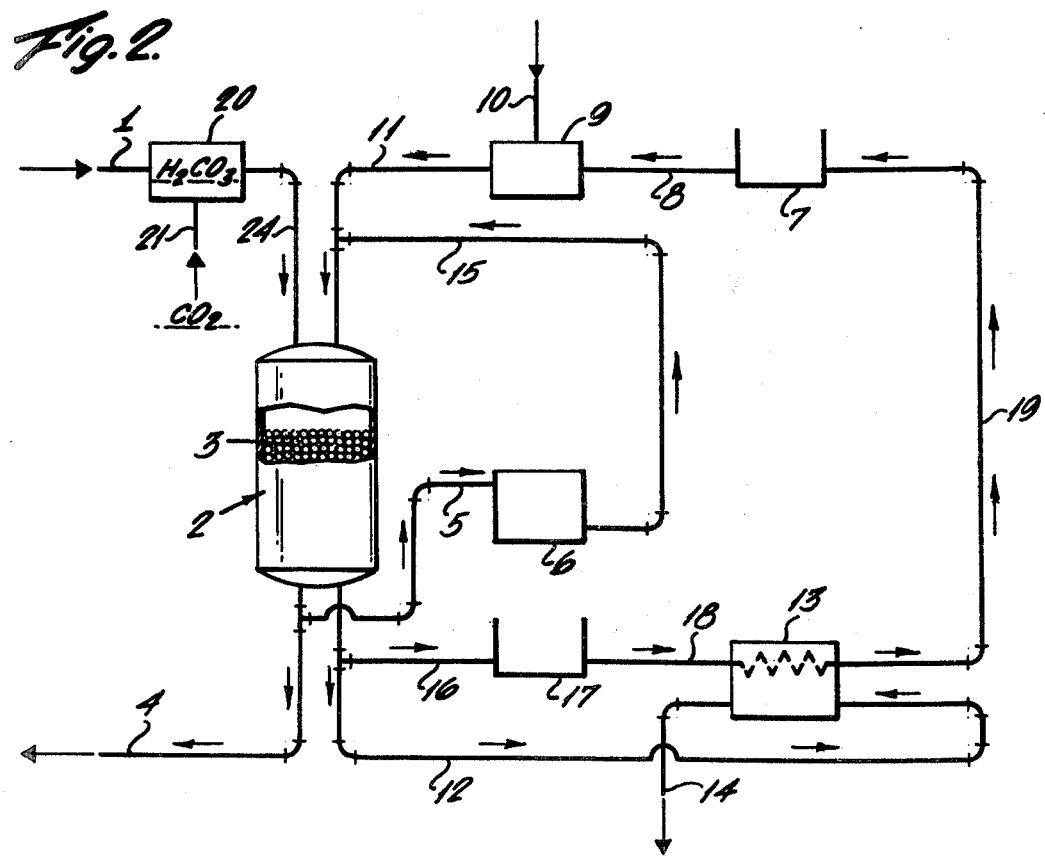

FIG. 2 illustrates an example of a fixed-bed type desalination system wherein the desalination occurs simultaneously with conversion of the free base form weak base groups, resulting from thermal elution by the method of this invention, to a carbonate form.

After the thermal elution and the subsequent cooling have been carried out similarly to the operation of FIG. 1, an aqueous feed solution containing the salt of a strong acid and maintained below 30° C. is delivered by feed line 1 to a gas dissolver 20, wherein carbon dioxide gas is blown via line 21 into the aqueous solution to give a carbonic acid containing aqueous solution. This aqueous solution is passed via line 24 through the fixed-bed type desalination column 2 to convert the free base form weak base groups of the ion-exchange resin bed 3 into a carbonate form. There is obtained a desalinated aqueous solution which is removed via effluent line 4. Any insufficiently desalinated portion of the effluent occurring toward the end of the desalination process and containing salts at a lower concentration than the original aqueous solution is passed via line 5 to the circulation water storage tank 6 to be used afterward as cooling water. If it is desired to omit the independent cooling stage and instead cool simultaneously with loading of the resin bed 3, the insufficiently desalinated portion of the effluent occurring in the initial phase of the desalination process may be passed as a hot effluent via line 16 to the storage tank 17 and the subsequent desalinated portion of the effluent collected from line 4. The efficiency of desalination is improved in the method of FIG. 2 by introducing carbon dioxide into the aqueous feed directly rather than in a separate free base to carbonate conversion step as in the method of FIG. 1. A one fifth to one half conversion of free base form weak base groups formed during thermal elution is sufficient to produce acceptable desalination performance.

Figure 3:
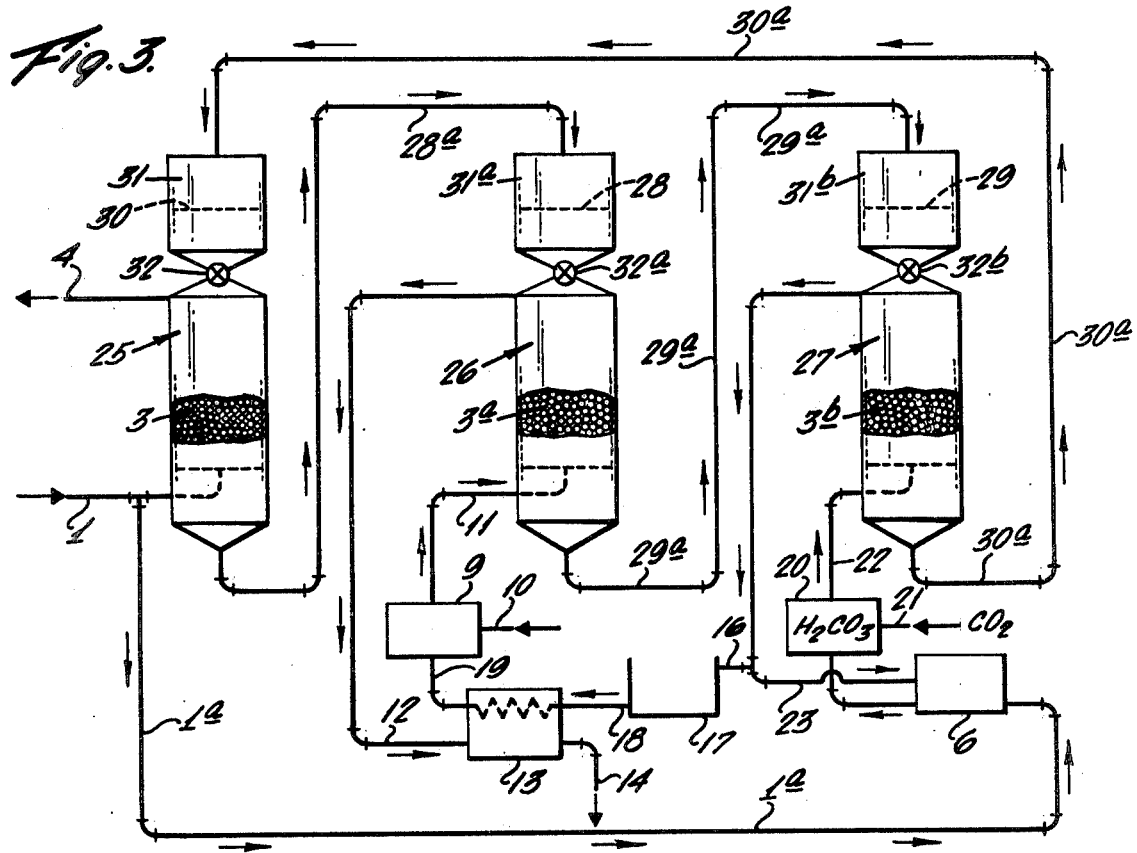

FIG. 3 illustrates an example of a moving bed type (continuous) desalination system wherein the desalination occurs after the free base form weakly basic groups (resulting from thermal elution by the method of this invention) have been converted to the carbonate form. In the moving bed desalination, the desalination is improved by contacting the ion-exchange bed and the aqueous feed solution countercurrently.

With reference to FIG. 3, the aqueous feed solution containing the salt of a strong acid is kept below 30° C. and desalinated by passage via feed line 1 through a moving bed desalination column 25 packed with an ion-exchange resin bed 3, to afford a desalinated aqueous solution exiting via effluent line 4. By pulsing the treatment, i.e., by alternately stopping and starting the aqueous feed at fixed intervals, the carbonated ion-exchange resin 30 in the ion-exchange resin storage tank 31 located above column 25 is delivered via the valve 32 into column 25. The ion-exchange resin 28 which has adsorbed the salt from the aqueous solution is forwarded via line 28a by a pressurized water stream to the ion-exchange resin storage tank 31a located above the moving bed elution column 26. Then, through column 26 hot water (heated to a temperature of 80° to 95° C. in the heater 9 by steam introduced via line 10) is admitted via line 11 to heat the ion exchange resin bed 3a and remove the strong acid salt from the resin, yielding a hot eluate. This hot eluate and heat recovering water from the eluting water storage tank 17 are forwarded to the heat exchanger 13 via lines 12 and 18, respectively, wherein the heat retained by the hot eluate is recovered. Concentrated waste water is discarded via line 14 and heat recovery water is obtained for transfer to heater 9 via line 19. By suspending passage of the hot water to column 26 via line 11 and restarting the passage at fixed intervals (pulsing), the loaded ion exchange resin 28 received after desalination in the ion-exchange resin storage tank 31a located above elution column 26 is fed through the valve 32a into column 26. The ion-exchange resin 29 which has undergone thermal regeneration is sent by a pressurized water stream via line 29a to the ion exchange resin storage tank 31b located above the moving bed cooling and carbonating column 27.

Through column 27 is passed via line 22 carbonated water (obtained in the gas dissolver 20 by forced introduction via line 21 of carbon dioxide gas into water at a temperature below 30° C., such water having been received from the circulation water storage tank 6). Consequently, the ion-exchange resin bed 3b in column 27, is cooled and, at the same time, the free base form weak base groups of the resin are converted into a carbonate form. In this case, the hot effluent occurring in the initial phase of the treatment is forwarded via line 16 to the eluting water storage tank 17 and the cooled water resulting from the cooling treatment is returned via line 23 as carbonated water to the circulation water storage tank 6, to be used afterward for cooling and carbonation.

The circulation water storage tank 6 is replenished via line 1a with the aqueous feed solution which solution is kept below 30° C.

Conversion to a carbonate form of about one fifth to one half of the free base form weak base groups resulting from the thermal elution, is sufficient for desalination purposes. By pulsing, i.e., by stopping and starting the passage of carbonated water through line 22 at fixed intervals, the ion-exchange resin 29 (which has undergone elution and is received in the ion-exchange resin storage tank 31b located above column 27) is fed via the valve 32b to column 27. The ion-exchange resin 30 (which has undergone the treatments for cooling and carbonation) is returned by a pressurized water stream into the ion-exchange resin storage tank 31 located above desalination column 25.

Figure 4:
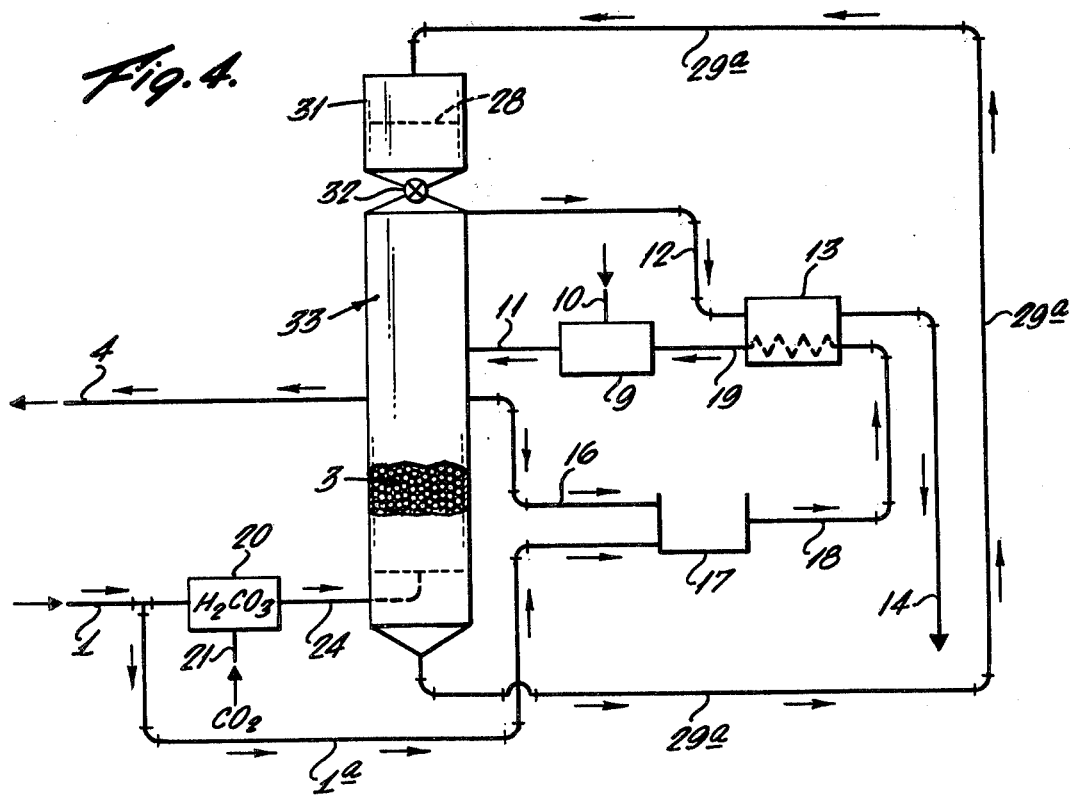

FIG. 4 illustrates an example of a moving bed type (continuous) desalination system wherein the desalination is carried out simultaneously with conversion of the free base form weak base groups (resulting from thermal regeneration by the method of the present invention) to a carbonate form. Unlike the system of FIG. 3, the system in this case uses only one moving bed reaction column 33 packed with the ion-exchange resin 3. However, the reference numerals otherwise indicate the same components as in FIG. 3. In the moving bed desalination of FIG. 4, the efficiency of the desalination is improved by causing the flow of the ion-exchange resin and that of the aqueous feed solution to come into contact in a counter current fashion.

With reference to the system of FIG. 4, the aqueous feed solution, which contains the salt of a strong acid and is kept under 30° C., is forwarded to the gas dissolver 20 wherein carbon dioxide gas is blown via line 21 and dissolved. The resulting aqueous solution containing carbonic acid is passed via line 24 through the thermally regenerated portion (bottom portion of column 33 or resin loading zone) of the ion-exchange resin bed 3 packed in the moving bed reaction column 33. In this case, the desalination proceeds as the ion-exchange resin 3 is cooled and the free base form weak base groups of the resin are converted into a carbonate form. The hot effluent resulting from passage of the aqueous feed solution through column 33 is forwarded via line 16 to the eluting water storage tank 17. The effluent removed via effluent line 4 is a desalinated aqueous solution. The forced introduction of carbon dioxide gas via line 21 is required only to an extent such that one fifth to one half of the free base form weak base groups resulting from the thermal regeneration are converted to a carbonate form. Resin movement is accomplished by pulsing the carbonated feed flow in the following sequence. Stopping the flow through line 24 causes the resin bed within the moving bed reaction column 33 to move downward in the columns and also causes eluted resin 28, stored in storage tank 31 located above the moving bed reaction column 33, to be delivered into the elution zone (upper portion of column 33, also known as resin regeneration zone) of the moving bed reaction column 33 via valve 32. Restoring the flow of carbonated feed, the eluted resin held in the lower most zone (resin loading zone) of the moving bed reaction column 33 is forwarded via line 29a to the ion exchange resin storage tank 31 by a pressurized water stream.

In the elution zone (upper portion) of the moving bed reaction column 33, the thermal regeneration is carried out at the same time that the passage of the carbonic acid containing aqueous feed solution is started via line 24. When the thermal regeneration is completed earlier than the desalination, the elution is suspended until the passage of the aqueous feed solution is started in the next cycle. For the purpose of the thermal regeneration, the water with recovered heat is forwarded via line 19 to the heater 9 and steam is blown into the water via line 10. The heated water now elevated to 80° to 95° C. is passed via line 11 through the bed of ion exchange resin beads 3 packed in the elution zone of the moving bed reaction column. The hot eluate which is consequently discharged from the column is forwarded via line 12 to the heat exchanger 13 in conjunction with the heat recovering water coming from the eluting water storage tank 17 via line 18. Thus, hot water is produced by recovery of the heat from the hot eluate received from column 33 via line 12. The concentrated effluent is discarded via line 14. When necessary, the aqueous feed solution is forwarded by way of line 1a to replenish the eluting water storage tank 17.

A commonly assigned copending application U.S. Ser. No. 843,197 filed Oct. 18, 1977 describes in greater detail the system of FIG. 4 (except for the carbonation feature) as well as ion exchange resins which may be rendered useful in all systems of the present invention by carbonation. Such application is incorporated herein by reference.

The following examples illustrate several preferred embodiments of the invention.

EXAMPLE 1

Resin beads of a macroreticular structure obtained by copolymerization of styrene with divinyl benzene and having a particle diameter of 1–0.3 mm, a porosity of 50%, an average pore diameter of 0.1 μm and a specific surface area of 25 m$^2$/g of resin (measured by the BET method) were dispersed in water. To the water suspension, a mixed solution of methyl acrylate, divinyl benzene, diisobutyl ketone and benzoyl peroxide was added for incorporation into the macropores of the resin beads by virtue of capillary action. The resultant mixture was thermally polymerized to afford a hybrid polymer, which was dried and then chloromethylated with chloromethyl ether in the presence of aluminum chloride as a catalyst. To the chloromethylated polymer was added dimethylamine and sodium hydroxide, followed by heating to induce amination of the chloromethylated polymer and hydrolysis of the polymethyl acrylate, thus giving a thermally regenerable type desalination resin having tertiary amino groups and carboxyl groups (0.5 g equivalent of amino group and 1.3 g equivalent of carboxyl group per liter of resin, with pKb 8.7 and pKa 5.3). Two cylinders 11.3 cm in diameter and 1.5 m in height were each packed with 10 liters of this resin, yielding a bed height of 1 meter. Two desalination columns (A and B) were thus obtained. In column A, desalination was performed by the conventional fixed-bed type operation. In column B, desalination was performed by the method of the present invention (fixed-bed type operation illustrated in FIG. 1). Table 1 gives the composition and temperature of the saline water ("feed water") treated as described hereinafter.

TABLE 1

| Composition of Raw (Feed) Water | |
|---|---|
| Component | Concentration (mg as CaCO$_3$/liter |
| Na | 650 |
| Ca | 20 |
| Cl | 630 |
| SO$_4$ | 20 |
| Total salts | 650 |
| Temperature | 20° C. |

Before the desalination columns were put to use, the desalination resin beds therein were eluted by passing through each of the columns 40 liters of hot water heated to 90° C. by forced introduction of steam into the feed water. The passage was downflow at a flow rate of 200 liters/hour.

For the first cooling of the resin bed in the desalination column A, 12 liters of the feed water was passed downflow through the resin bed at a flow rate of 200 liters/hour. The effluent resulting from this passage was sent to storage as part of the eluting water for use in the subsequent elution. For the first desalination, the feed water was passed through the resin bed at the same flow rate, the effluent being sent to storage as desalinated water. The desalination was continued until the total salt concentration in the effluents water in the desalinated water storage tank fell to 150 mg/liter (as CaCO$_3$). For the second elution, 40 liters of water, obtained by adding 28 liters of feed water to 12 liters of the stored eluting water, was used. In the second and subsequent cycles of elution, 40 liters of composite elution water obtained by adding 28 liters of feed water to 12 liters of the stored eluting water was passed through a heat exchanger to recover heat from the hot eluate. The composite water now at a lowered temperature was heated to 90° C. by forced introduction therein of steam. The 40 liters of the heated water was passed downflow through the resin bed at a flow rate of 200 liters/hour to effect elution. The resultant eluant was passed through the heat exchanger to recover heat therefrom. The cooling and desalination after the second and subsequent cycles of elution were performed similarly to those carried out after the first cycle of elution. By repeating the operations of elution, cooling and desalination as described above, there was obtained 82 liters of desalinated water having an average salt concentration of 150 mg/liter (as CaCO$_3$) at the end of the fifth cycle of desalination. The effective desalination capacity was 0.082 g equivalent/liter of resin. The time required for the desalination was 25 minutes and the combined regeneration time covering both the elution and cooling operations was 16 minutes.

In the desalination column B, the resin bed was given an initial cooling in the same manner as in the case of the desalination column A. Then for conversion of the resin to a carbonate form according to the present invention, 50 liters of saturated carbonic acid aqueous solution obtained by forced introduction of carbon dioxide gas into the feed water was passed downflow through the resin bed at a flow rate of 200 liters/hour. In the second and subsequent cycles of conversion of the resin to a carbonate form following cooling, the saturated carbonic acid water obtained by forced introduction of carbon dioxide gas into 20 liters of stored eluting water for conversion to a carbonate form was passed downflow at a flow rate of 200 liters/hour. All of the effluent was recovered and returned to the column to recycle the operation until the overall volume of the carbonic acid water passed through the resin bed reached 50 liters. In the second and subsequent cycles, the desalination following the operation of conversion to a carbonate form was performed similarly as described with reference to column A. By repeating the operations of elution, cooling and carbonation as described above, 120 liters of desalinated water having an average salt concentration of 150 mg/liter (as CaCO$_3$) was obtained at the end of the fifth cycle of desalination. The effective desalination capacity was found to be 0.12 g equivalent/liter of resin. The time required for the desalination was 37 minutes and the combined time for elution, cooling and carbonation was 31 minutes.

The yield of desalinated water at the end of the fifth cycle of desalination in the column B system (method of the present invention) was 46% greater than that of the desalinated water obtained at the end of the fifth cycle of desalination in the column A system (conventional method). The amount of hot water used for the elution per unit amount of desalinated water in the column B was 68% of that obtained in the column A.

EXAMPLE 2

By using the same thermal regeneration type desalination resin and the same feed water as in Example 1, the counterflow moving-bed treatment by the conventional method (column C) and that by the method of the present invention (column D in a system like that illustrated in FIG. 4) were compared.

Columns C and D were dimensionally identical and designed for a moving-bed type reaction according to the principles illustrated in FIG. 4 (elution zone 9.8 cm in diameter and 4 m in straight portion and containing 30 liters of resin; desalination zone 25.2 cm in diameter and 2.2 m in straight portion and containing 115 liters of resin; and transfer zone containing 15 liters of resin) and were each provided with a resin storage tank (containing 15 liters of resin).

The resin used in all the columns and tanks was put to use after it had been eluted by passing 4 liters (per liter of resin) of feed water pre-heated to 90° C. through the resin at a flow rate of 20 liters/hour under fixed conditions.

In both columns C and D, the feed water was fed upflow through the base of the desalination zone of the reaction column at a flow rate of 2 m$^3$/hour. The first 25-liter portion of the effluent emerging from the upper surface of the desalination zone was sent to the eluting water tank for use as cooling water. In this case, the feed water fed to the column D operated by the method of this invention had a prescribed amount of carbon dioxide gas dissolved therein by injection enroute to the column. The portion of the effluent emerging from the upper surface of the desalination zone after removal of the cooling water was collected as desalinated water. In the meantime, the portion of resin which collected in the lower-most zone of the reaction column was transported by a pressurized water stream to the resin storage tank located above the same reaction column.

At the same time that the passage of feed water to the column was started, the hot water obtained by passing the water from the eluting water storage tank through the heat exchanger and then heating with steam to 90° C. was fed upflow via the bottom of the elution zone of the same reaction column at a flow rate of 300 liters/hour and discharged on the upper level of the elution zone to a heat exchanger to heat incoming elution water. After this recovery of the heat, the water was discarded.

In column C, cooling and desalination by the passage of feed water were continued for a total of five minutes and, at the same time, the passage of hot water was continued for five minutes. Then, the passage of feed water and hot water were suspended for one minute to enable the resin bed to move downward and, at the same time, the resin in the resin storage tank to move into the elution zone located above the reaction column.

In column D, cooling and desalination by the passage of carbonated feed water was continued for 6.5 minutes and, the passage of hot water was simultaneously started and continued for five minutes. The passage of hot water was stopped at the end of the five minutes and the passage of feed water was suspended for one minute at the end of the 6.5 minutes to permit the resin bed to move downward and the resin of the resin storage tank to move to the elution zone located above the reaction column. The carbonation of the feed water for use in column D was rapidly carried out at a flow rate of 17 liters/minute of carbon dioxide into feed water flowing at 2 m$^3$/hour in the first four cycles of passage, and at a lowered flow rate of 2.2 liters/minute in subsequent cycles of passage.

The starting and stopping of the passage of feed water and that of hot water in feed columns C and D were repeated. In the 50th cycle of the feed water passage, 142 liters and 192 liters of desalinated water having a total salt concentration of 150 mg/liter (as CaCO$_3$) were obtained, respectively, in columns C and D.

For a fixed amount of resin circulated, the yield of desalinated water obtained by column D operated by the method of the present invention was 35% greater than that obtained by column C of the conventional method. The amount of hot water required for the elution per unit amount of desalinated water in column D was 74% of that required in column C.

I claim:

1. In an ion exchange process for desalination characterized by the steps of: (a) contacting an aqueous feed solution containing a salt of a strong acid with a thermally regenerable ion exchange resin having weakly acidic free acid groups and weakly basic free base groups whereby said resin is loaded with said salt by ion exchange and said feed solution is desalinated, (b) removing desalinated solution, and (c) thermally regenerating said resin and eluting from the resin the salt loaded thereon, the improvement which comprises converting said weakly basic free base groups to carbonate form weakly basic groups prior to or simultaneously with contact between said feed solution and said resin.

2. The process of claim 1 wherein said conversion is effected prior to contact between said feed solution and said resin.

3. The process of claim 1 wherein said conversion is effected simultaneously with contact between said feed solution and said resin.

4. The process of claims 1, 2 or 3, wherein said conversion is effected by contacting said free base groups with a carbonic acid solution.

5. The process of claims 1, 2 or 3 wherein said process is operated in a cyclic fashion by repeating said steps.

6. The process of claim 1 wherein the feed solution is deaerated before contact with said ion exchange resin having carbonate form weakly basic groups.

7. The process of claim 1 wherein said weakly acidic free acid groups have a pKa of about 5 to 6 and are bifunctional.

8. The process of claim 1 wherein said weakly basic free base groups have a pKb of about 8 to 9 and are monofunctional.

9. The process of claims 1, 2 or 3 wherein said resin comprises a fixed bed.

10. The process of claims 1, 2 or 3 wherein said resin comprises a moving bed and contact between said resin and the feed solution is countercurrent and pulsed.

11. A cyclic process according to claim 1 wherein said resin comprises a moving bed, contact between said feed solution and said resin is countercurrent in a first column, said loaded resin is transferred from said first column to a second column and thermally regenerated and eluted therein, the regenerated resin is then transferred to a third column and cooled and converted therein to a carbonate form, and said carbonate form resin is thereafter recycled to said first column to repeat said steps.

12. The process of claim 11 wherein said contact in step (a), said thermal regeneration and elution, and said conversion to the carbonate form are pulsed.

13. A cyclic process according to claim 1 wherein said resin comprises a moving bed, contact between said feed solution and said resin is countercurrent, said conversion to a carbonate form is effected simultaneously with said contact between the feed solution and resin, and said steps are pulsed in a single column wherein loaded resin is transferred via outside means from a lower portion of the column to an upper portion thereof for thermal regeneration and elution in said upper portion.

14. The process of claim 1 wherein at least about one fifth to about one half of the weakly basic free base form groups are converted to a carbonate form.